(12) United States Patent
Wu et al.

(10) Patent No.: US 7,575,357 B2
(45) Date of Patent: Aug. 18, 2009

(54) BACKLIGHT SYSTEM AND LCD USING THE SAME

(75) Inventors: Meng-Chai Wu, Hsin-Chu (TW); Chin-Kun Hsieh, Hsinchu (TW)

(73) Assignee: AU Optronics Corporation (TW)

( * ) Notice: Subject to any disclaimer, the term of this patent is extended or adjusted under 35 U.S.C. 154(b) by 463 days.

(21) Appl. No.: 11/110,342

(22) Filed: Apr. 19, 2005

(65) Prior Publication Data

US 2006/0232995 A1    Oct. 19, 2006

(30) Foreign Application Priority Data

Jan. 28, 2005    (TW) .............................. 94102671 A

(51) Int. Cl.
*F21V 7/04*    (2006.01)

(52) U.S. Cl. ...................... 362/613; 362/276; 362/802; 349/68

(58) Field of Classification Search ................. 362/613, 362/276, 802; 349/68
See application file for complete search history.

(56) References Cited

U.S. PATENT DOCUMENTS

| | | | |
|---|---|---|---|
| 4,868,459 A * | 9/1989 | Dennerlein et al. | ......... 315/158 |
| 6,219,117 B1 | 4/2001 | Nagakubo et al. | |
| 6,422,710 B1 | 7/2002 | Herzog et al. | |
| 6,930,737 B2 * | 8/2005 | Weindorf et al. | .............. 349/96 |
| 2002/0030772 A1 | 3/2002 | Nauta et al. | |
| 2003/0067436 A1 | 4/2003 | Hara et al. | |
| 2003/0230991 A1 * | 12/2003 | Muthu et al. | ................. 315/307 |
| 2004/0114342 A1 | 6/2004 | Lin et al. | |

FOREIGN PATENT DOCUMENTS

| | | |
|---|---|---|
| CN | 1184262 A | 6/1998 |
| CN | 1395665 A | 2/2003 |
| CN | 1558276 A | 12/2004 |
| TW | 573146 | 1/2004 |

\* cited by examiner

*Primary Examiner*—Jason Moon Han
(74) *Attorney, Agent, or Firm*—Squire, Sanders & Dempsey, L.L.P.

(57) ABSTRACT

A backlight system and an LCD using the same are provided. The present backlight system is equipped with a light-source driving module and several light sources of different optimum working temperature ranges. Hence, according to the environmental temperature, appropriate light source(s) will be driven by the light-source driving module to maintain a constant light output of the backlight system.

12 Claims, 4 Drawing Sheets

BACKLIGHT SYSTEM AND LCD USING THE SAME

BACKGROUND OF THE INVENTION

1. Field of the Invention

The present invention relates to a backlight system, and more particularly relates to a backlight system equipped with several light sources, driven according to the environmental temperature.

2. Description of the Related Art

In a display device, how to start its backlight quickly and make it work constantly are important subjects, and while the display device is applied in vehicle movement, the performance of the backlight will directly influence the drivers' behaviors about driving. But in conventional backlights, light sources of the same kind have always been used and operated in a constant temperature range, hence, when the transport runs into bad weather or under a higher or lower temperature environment, the light sources are often unable to be started or only provide an insufficient brightness. For example, the cold cathode fluorescent lamp (CCFL) is often used as the light source in the conventional backlights, but in a cold weather, this kind of light source is difficult to start, and it must take several minutes to warm up to be bright enough for the operation information being recognized easily.

In addition, the light-emitting diode (LED) is another common kind of light source used in the backlights, but in contrast to the CCFL, the LED is unsuitable for operating in high temperature conditions.

Therefore, even if several light sources are arranged in a backlight, but their lighting efficiency and adaptability to the environmental temperature is undifferentiated. In other words, when one light source is ineffectual in a high or low temperature, other light sources are ineffectual, too. Hence, the motor vehicle driver's safety will be threatened by the arrangement of same kind of light sources in the conventional backlight.

SUMMARY OF THE INVENTION

As in the above description, in a display device, the conventional backlight is unreliable for using the same kind of light source. Hence, to solve the problems of the conventional backlight, a backlight system and an LCD using the same are provided. One of the objectives of the present invention is to provide a backlight system for operating smoothly in a wide temperature range. Another one of the objectives of the present invention is to provide a backlight system equipped with a backup light source to ensure an uninterrupted light output.

According to the above-mentioned objects, the present invention provides a backlight system and applies it to an LCD. The backlight system is equipped with several light sources of different optimum working temperature ranges, and those light sources will be driven either alone or together by a light-source driving module according to the present environmental temperature. Furthermore, when one light source is broken or inefficient, other light sources will be driven instantly to provide a backup lighting.

In addition, the present invention also provides an LCD comprising an LCD panel and a backlight system arranged adjacent to the LCD panel.

The objectives and the advantages of the present invention are expressed by the following writings of embodiments and drawings.

BRIEF DESCRIPTION OF THE DRAWINGS

The objectives, features of the present invention as well as the advantages thereof can be best understood through the following preferred embodiments and the accompanying drawings, wherein.

DESCRIPTION OF THE PREFERRED EMBODIMENT

Figure 1:
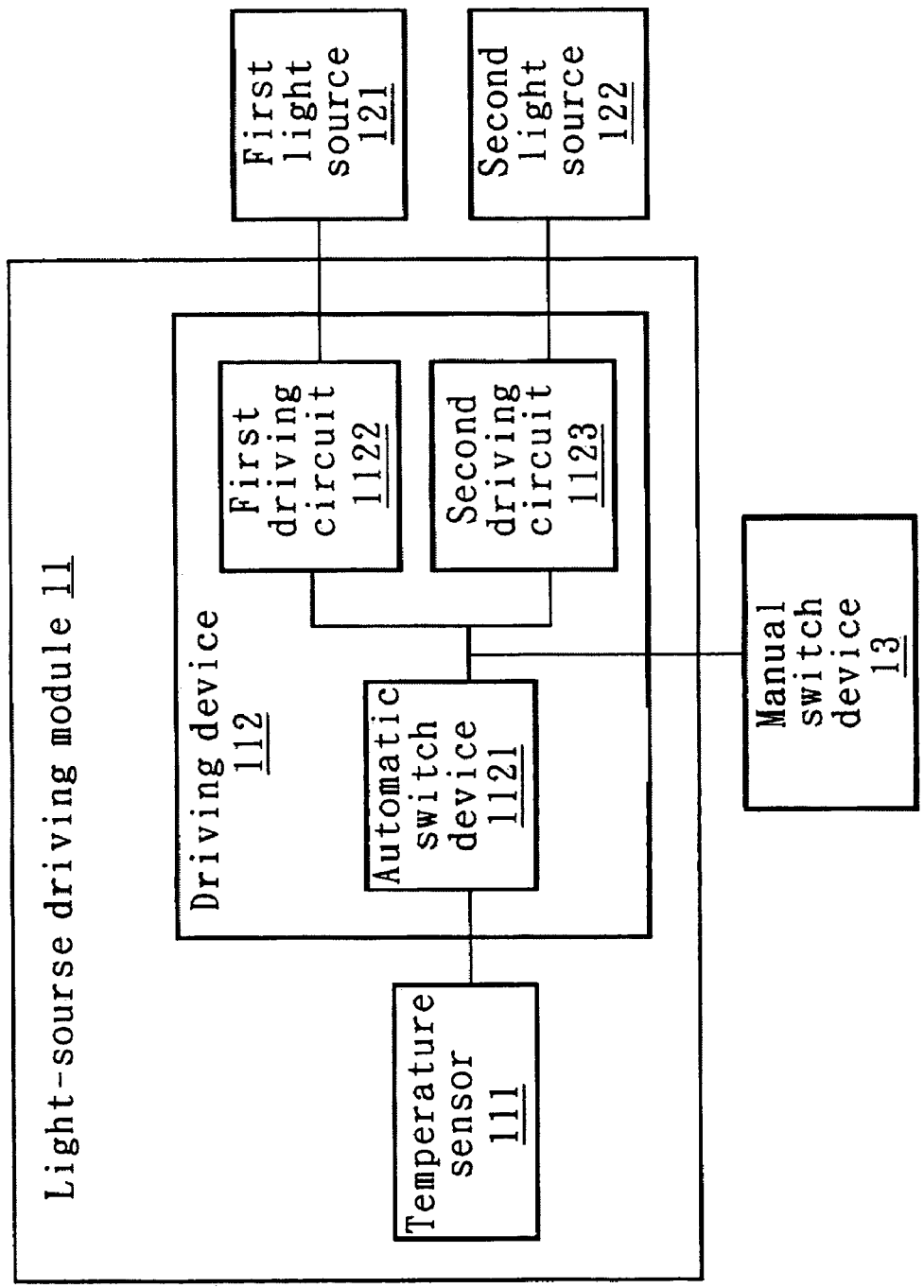
FIG. 1 shows a system configuration of a backlight provided by present invention.

One preferred embodiment of the present invention provides a backlight system, and FIG. 1 illustrates its system configuration. The backlight system is composed of a light-source driving module 11, a first light source 121, and a second light source 122 different from the kind of the first light source 121, wherein the light-source driving module 11 comprises a temperature sensor 111 and a driving device 112, and the first light source 121 and the second light source 122 are individually selected from a light emitting diode (LED) array and a cold cathode fluorescent lamp (CCFL).

Whenever the backlight light system is started up, the temperature sensor 111 will detect the environmental temperature and correspondingly providing a temperature parameter to the driving device 112. And within the driving device 112, an automatic switch device 1121 is responsible for receiving and processing the temperature parameter and then sending a driving signal to a first driving circuit 1122 or a second driving circuit 1123 for initializing the first light source 121 or the second light source 122.

In this preferred embodiment, the LED array is selected as the first light source 121 for its well cold-resistant ability, and in contrast, the CCFL is selected as the second light source 122 for its ability in operating in room temperature or higher. Hence, when the backlight system is started under a cold or snowy environment, the temperature sensor 111 will immediately provide a low-temperature parameter to the automatic switch device 1121, and the driving signal will selectively be sent to the first driving circuit 1122 to initiate the LED array. After the LED array has operated for a specific span of time to complete the warm-up process, or the environment has reached a higher temperature, the automatic switch device 1121 will switch the driving signal to the second driving circuit 1123 to start the CCFL.

Furthermore, when the backlight system is started under room temperature or higher, the temperature sensor 111 will immediately provide a high-temperature parameter to the automatic switch device 1121, and the driving signal will selectively be sent to the second driving circuit 1123 to initiate the CCFL.

In addition, according to the present invention, if the environmental temperature is suitable for both the LED array and the CCFL, the automatic switch device 1121 could be set to send two driving signals to the first and second driving circuits 1122, 1123—starting both LED array and CCFL.

In general, the optimum operating temperature for the light source, for example, an LED, is lower than 85° C., but in fact, if the operating temperature is increasing and higher than about 50° C., the LED's lighting efficiency will begin to decrease. Besides, the optimum operating temperature for the CCFL is about 20° C. to 60° C. Hence, in view of their individual differences of LED and CCFL, there are two determination mechanisms programmed in the backlight provided by this preferred embodiment to decide which light sources ought to be driven.

The first is to set and to store a switch temperature such as 40° C. in the backlight system. Hence, if the environmental temperature is detected and judged lower than 40° C., the automatic switch device 1121 will only drive the LED array; and in contrast, if the environmental temperature is equal to or higher than 40° C., the driving signal will only drive the CCFL.

The second is to set and store a switch temperature period such as from 20° C. to 40° C. in the backlight system. Hence, if the environmental temperature is detected and judged lower than 20° C., the automatic switch device 1121 will only drive the LED array; if the environmental temperature is equal to or between 20 and 40° C., the automatic switch device 1121 will drive both the LED array and the CCFL; and if the environmental temperature is higher than 40° C., the driving signal will only drive the CCFL. Switch temperatures or switch temperature periods can be set or saved in the automatic transfer device 1121 or in a memory device (not shown) connecting to the automatic transfer device 1121.

According to this preferred embodiment, the operating status of the first light source 121 or the second light source 122 is being monitored all the time. As soon as one light source is ineffectual under improper temperature or broken by some external factors, the automatic switch device 1121 will drive another light source immediately to make an uninterrupted output of lighting of the backlight system. In addition, the backlight system could further comprise a manual switch device 13 such as a set of switches or buttons to control the light-source driving module 11. The manual switch device 13 is directly connecting to the first driving circuit 1122 and the second driving circuit 1123 for providing a backup manual-start mechanism while the temperature sensor 111 or the automatic switch device 1121 is broken.

Figure 2A:
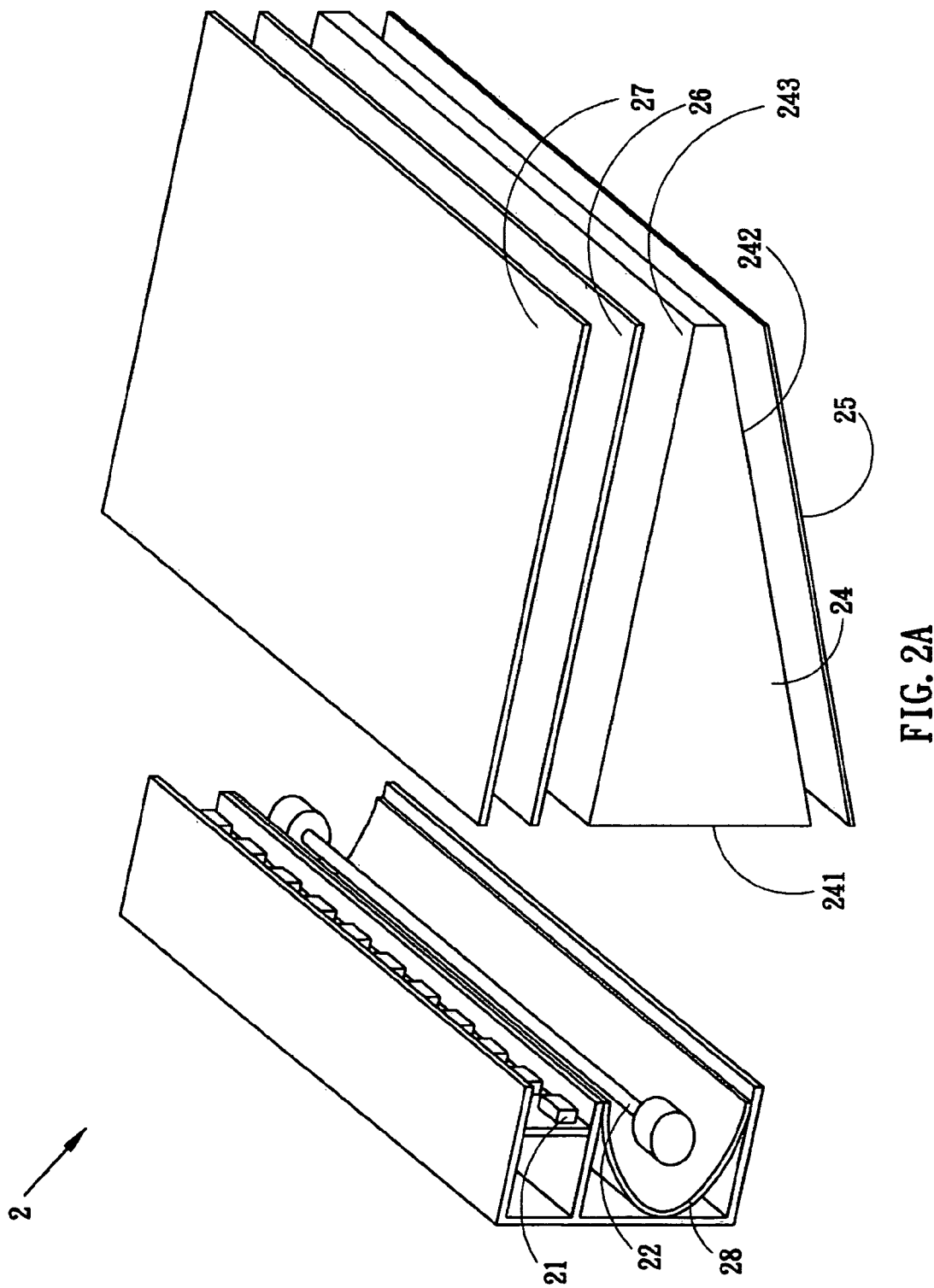
FIG. 2A shows an exploded view of an edge-lighting backlight system provided by one preferred embodiment of present invention.

The practical structure of the light sources in the backlight system provided by the present invention could be selected from a bottom-lighting or edge-lighting arrangement. Referring to FIG. 2A, which shows the relative positions among the light sources and other optical elements of an edge-lighting backlight system 2 provided by this preferred embodiment. The LED array 21 and the CCFL 22, selected as the first and second light sources, are placed adjacent to an identical wedge-shaped light guide plate 24 and face it's incidence surface 241, wherein, the LED array 21 is arranged over the CCFL 22, but in other preferred embodiment, their positions could be exchanged. Besides, in the backlight system 2, a reflector, such as a reflective film 25 could be arranged behind the under surface 242 of the light guide plate 24 to reflect the light back to the light guide plate 24; and other optical films such as diffusion film 26 and prism sheet 27 are arranged above the emitting surface 243 of the light guide plate 24. In this preferred embodiment, the LED array 21 or the CCFL 22 is capable of providing a sufficient brightness to make the operation information showing in the display panel of a display device recognizable.

Figure 2B:
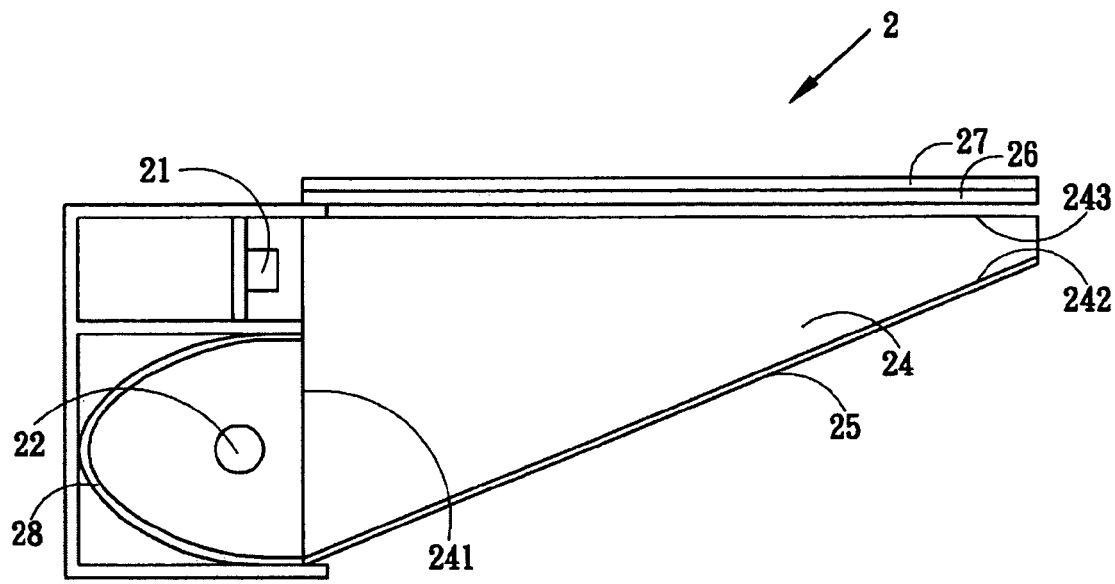
FIG. 2B shows a cross section view of the edge-lighting backlight system provided by one preferred embodiment of present invention.
Figure 2C:
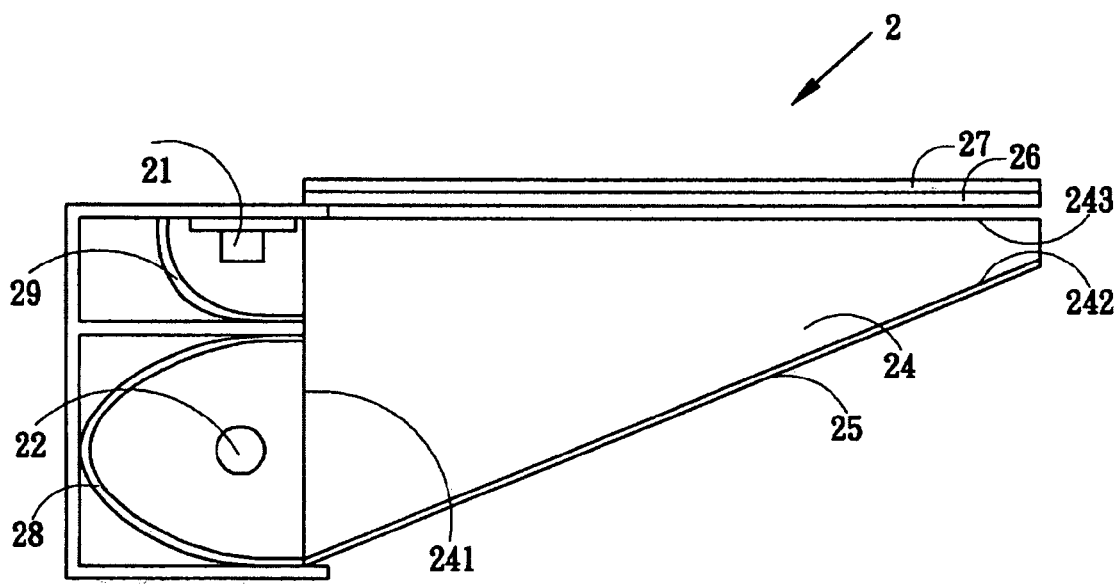
FIG. 2C shows another arrangement of the light sources in the edge-lighting backlight system provided by present invention.

Referring to FIG. 2B, which shows a cross section view of the edge-lighting backlight system 2 provided by this preferred embodiment. It can be observed that the emitting direction of the LED array 21 is directly toward the incidence surface 241 of the light guide plate 24; and the emitting direction of the CCFL 22 is guided toward the incidence surface 241 by the help of an arc-shaped reflective sheet 28. Referring to FIG. 2C, in other preferred embodiments of the present invention, the light from the LED array 21 could be guided to emitting into the incidence surface 241 by the help of another arc-shaped reflective sheet 29.

Figure 2D:
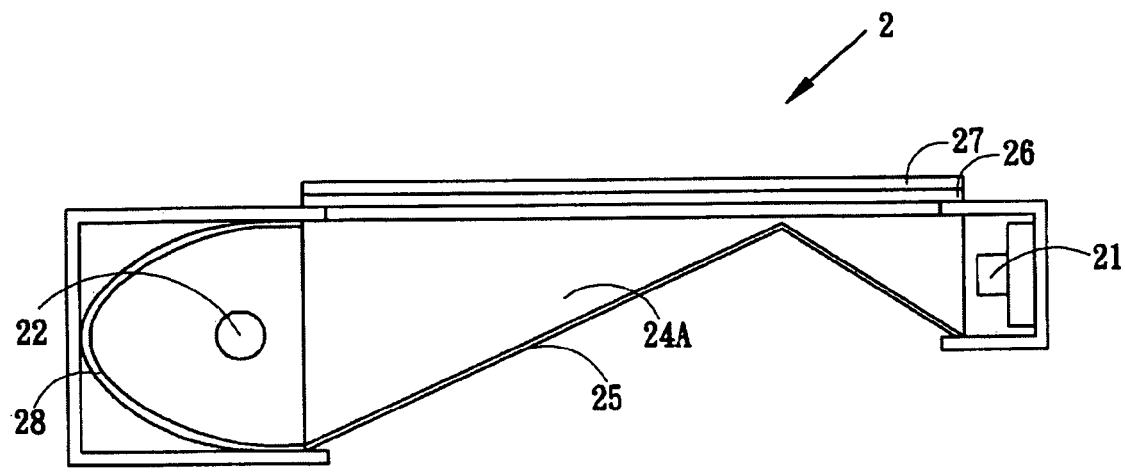
FIG. 2D shows a cross section view of a backlight system equipped with primary and backup light sources according to present invention.

In addition, when the backlight system is applied to a display device and the display panel of the display device is divided into several display areas; the present invention is capable of providing several separate backlights to each display area. For example, if the backlight system 2 provided by present invention is applied into an LCD and its display panel is divided into two display areas—the primary display area and emergent display area, the backlight will be able to make a corresponding adjustment—equipped with primary light source and backup light source, such as in FIG. 2D. In the backlight system 2 provided by another preferred embodiment of the present invention, a CCFL 22 is arranged as the primary light source and its emitting direction is guided toward one incidence surface of a dual-wedge-shaped light guide plate 24A; in addition, an LED array 21 is arranged to be the backup light source and its emitting direction is toward the other incidence surface of the dual-wedge-shaped light guide plate 24A. In regular operational conditions, only the primary light source, the CCFL 22, is started to provide backlighting for the primary display area of the LCD (not shown); but if the primary light source is ineffectual under improper temperature (such as lower than 20° C.) or broken by the external factor, the backup light source, the LED array 21, will be started immediately to backlight the emergent display area for showing the driver (operator) some particular or essential operational information. In contrast, the CCFL 22 and LED array 21 could be exchanged as the backup and primary light sources in other backlight systems, and if the LED array 21 is ineffectual under the improper temperature (such as higher than 50° C.) or broken by external factors, the LED array 21 will be started to backlight the emergent display area.

Figure 2E:
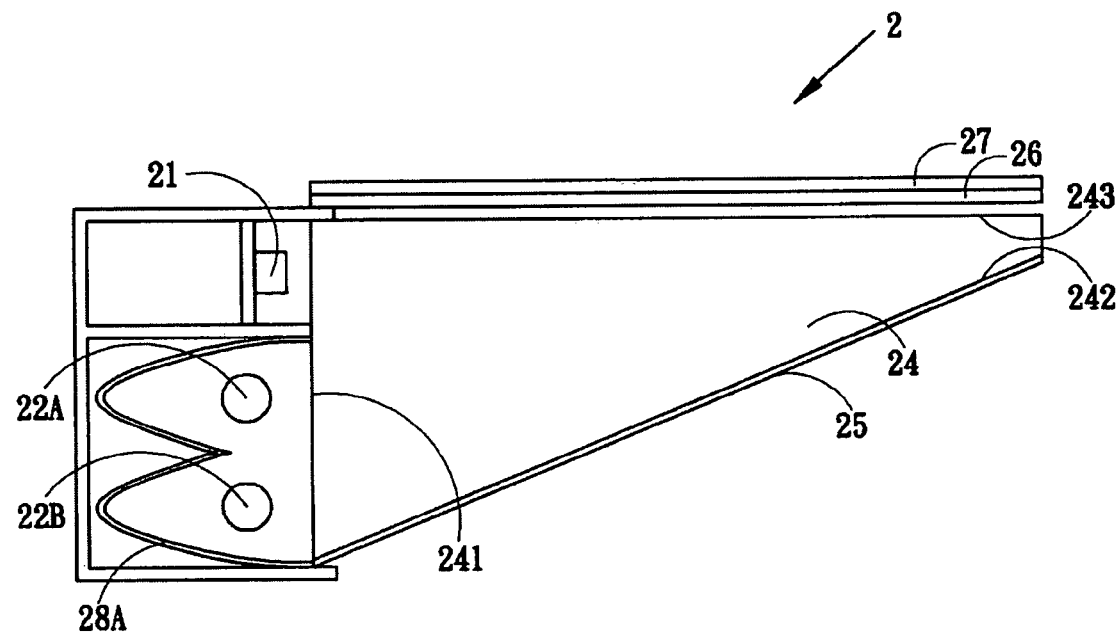
FIG. 2E shows a cross section view of a backlight system equipped with three light sources according to present invention.

According to this preferred embodiment, the LED array and the CCFL are selected as the first and second light sources in the backlight system, but the number of light sources could be more than 2. For example, referring to FIG. 2E, an LED array 21 suitable for operating lower than 50° C., a first CCFL 22A suitable for operating from 50° C. to 80° C., and a second CCFL 22B suitable for operating higher than 80° C. are selected as the first, second, and third light sources in the backlight system 2 of other preferred embodiment, and they will be driven by the automatic switch device (not shown) according to the present environmental temperature. And the first CCFL 22A and the second CCFL 22B are guided to emit into the incidence surface 241 by the help of an M-shaped reflective sheet 28A.

In the present invention, the backlight system is equipped with several light sources of different optimum working temperature ranges, but the selection of light sources are not limited to the LED and CCFL only, other kinds of solid or gas-discharge light sources could be arranged in other preferred embodiments.

The present backlight system could be applied into an LCD, and the backlight system is arranged behind its display panel.

The above-mentioned preferred embodiments of the present invention are just for example, not limits. Thus, many variations and modifications of the embodiments made without departing form the spirit of the present invention should be covered by the following claims.

What is claimed is:

1. A backlight system, comprising:
a light guide plate having an incidence surface;
a first light source disposed adjacent to said incidence surface;
a second light source disposed adjacent to said incidence surface, said second light source differing from said first light source, wherein said first light source and said second light source have two different operation temperature ranges; and
a light-source driving module, wherein said light-source driving module comprises:
a temperature sensor for detecting the environmental temperature and providing a temperature parameter; and
a driving device for selectively driving said first light source and said second light source according to the temperature parameter and the operation temperature ranges,
wherein the backlight system further comprises a third light source disposed adjacent to said incidence surface, wherein said first light source, said second light source, and said third light source are driven selectively by said light-source driving module according to the environmental temperature,
wherein said first light source comprises an LED array, and said second light source and said third light source comprise CCFLs, and
wherein said light-source driving module is configured to drive said first light source in response to the environmental temperature substantially lower than 50° C., said light-source driving module is configured to drive said second light source in response to the environmental temperature substantially between 50° C. and 80° C., and said light-source driving module is configured to drive said third light source in response to the environmental temperature substantially higher than 80° C.

2. The system of claim 1, wherein said first light source is disposed over said second light source.

3. The system of claim 1, wherein said first light source is disposed beneath said second light source.

4. The system of claim 1, wherein said driving device comprises an automatic switch device for providing a driving signal according to said temperature parameter.

5. The system of claim 4, further comprising a manual switch device for controlling the light-source driving module.

6. The system of claim 1, further comprising a manual switch device for controlling the light-source driving module.

7. The system of claim 1, wherein said backlight system is an edge-lighting light source module.

8. The system of claim 1, further comprising a reflector, wherein said first light source is disposed between said light guide plate and said reflector.

9. The system of claim 8, wherein said second light source is disposed between said light guide plate and said reflector.

10. A liquid crystal display (LCD), comprising:
an LCD panel; and
a backlight system disposed adjacent to said LCD panel, wherein said backlight system comprises:
a light guide plate having an incidence surface;
a first light source disposed adjacent to said incidence surface;
a second light source disposed adjacent to said incidence surface, said second light source differing from said first light source, wherein said first light source and said second light source have two different operation temperature ranges; and
a light-source driving module, wherein said light-source driving module comprises:
a temperature sensor for detecting the environmental temperature and providing a temperature parameter; and
a driving device for selectively driving said first light source and said second light source according to the temperature parameter and the operation temperature ranges,
wherein the backlight system further comprises a third light source disposed adjacent to said incidence surface, wherein said first light source, said second light source, and said third light source are driven selectively by said light-source driving module according to the environmental temperature,
wherein said first light source comprises an LED array, and said second light source and said third light source comprise CCFLs, and
wherein said light-source driving module is configured to drive said first light source in response to the environmental temperature substantially lower than 50° C., said light-source driving module is configured to drive said second light source in response to the environmental temperature substantially between 50° C. and 80° C. and said light-source driving module is configured to drive said third light source in response to the environmental temperature substantially higher than 80° C.

11. The LCD of claim 10, wherein said first light source is disposed over said second light source.

12. A backlight system, comprising:
a light guide plate having an incidence surface;
a first light source disposed adjacent to said incidence surface;
a second light source disposed adjacent to said incidence surface;
a light-source driving module, wherein said first light source and said second light source are driven selectively by said light-source driving module according to an environmental temperature; and
a third light source disposed adjacent to said incidence surface, wherein said first light source, said second light source, and said third light source are driven selectively by said light-source driving module according to the environmental temperature,
wherein said first light source comprises an LED array, and said second light source and said third light source comprise CCFLs, and wherein said light-source driving module is configured to drive said first light source in response to the environmental temperature substantially lower than 50° C., said light-source driving module is configured to drive said second light source in response to the environmental temperature substantially between 50° C. and 80° C., and said light-source driving module is configured to drive said third light source in response to the environmental temperature substantially higher than 80° C.

* * * * *